(12) United States Patent
Wang

(10) Patent No.: US 7,991,444 B2
(45) Date of Patent: Aug. 2, 2011

(54) SLIDE MECHANISM FOR SLIDE-TYPE PORTABLE TERMINAL DEVICES

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 613 days.

(21) Appl. No.: 12/141,088

(22) Filed: Jun. 18, 2008

(65) Prior Publication Data

US 2009/0146537 A1    Jun. 11, 2009

(30) Foreign Application Priority Data

Dec. 5, 2007   (CN) .......................... 2007 1 0202853

(51) Int. Cl.
*H04M 1/00* (2006.01)
(52) U.S. Cl. ............... 455/575.4; 455/575.3; 455/575.1; 455/90.3; 455/566; 379/433.11; 379/433.12

(58) Field of Classification Search ............... 455/575.4, 455/575.3, 575.1, 90.3, 566; 379/433.11, 379/433.12
See application file for complete search history.

(56) References Cited

U.S. PATENT DOCUMENTS

| | | | |
|---|---|---|---|
| 2005/0059443 A1* | 3/2005 | Pan et al. .................... | 455/575.4 |
| 2008/0051163 A1* | 2/2008 | Kim et al. .................... | 455/575.4 |
| 2008/0119250 A1* | 5/2008 | Cho et al. .................... | 455/575.4 |

* cited by examiner

*Primary Examiner* — Sanh D Phu
(74) *Attorney, Agent, or Firm* — Zhigang Ma

(57) ABSTRACT

A slide mechanism (20) includes a rear cover (22), a front cover (24) slidably connected to the rear cover, and at least two magnetic members positioned on the rear cover and the front cover respectively. The front cover can be opened/closed relative to the rear cover semi-automatically via a magnetic force created by the at least two magnetic members. One of the front cover and the rear cover forms at least one protruding portion, and the other one of the front cover and the rear cover defines at least one recessed portion for engaging with the protruding portion. When the front cover is slid to an opened or closed position, the at least one protruding portion engages in the at least one recessed portion correspondingly.

14 Claims, 10 Drawing Sheets

SLIDE MECHANISM FOR SLIDE-TYPE PORTABLE TERMINAL DEVICES

BACKGROUND OF THE INVENTION

1. Field of the Invention

The present invention relates to slide mechanisms, and more particularly to a slide mechanism for a slide-type portable terminal device.

2. Discussion of the Related Art

Slide-type portable terminal devices, for example slide-type mobile phones are popular. The slide-type portable terminal has two housings. One housing slides over the other housing, thereby opening or closing the portable terminal device.

A typical slide mechanism includes a rear cover, a front cover slidably mounted on the rear cover, and two magnetic members positioned on the front cover and the rear cover, respectively. The front cover can be opened/closed relative to the rear cover semi-automatically via a magnetic force created by the two magnetic members. In the fully closed or fully open position of the front cover, the user applies an initial force to the front cover to move the front cover a predetermined distance. When the front cover reaches this predetermined distance, the front cover continues moving due to the magnetic force of the two magnetic members. Usually, in the hand-over from the initial user's force and the magnetic force the front cover may wobble due to a lack of retaining members between the front cover and the rear cover. Therefore, the front cover does not stably slide relative to the rear cover.

Therefore, a new slide mechanism which solve the above-described problems are desired.

SUMMARY

An exemplary slide mechanism includes a rear cover, a front cover and two sliding rods. The front cover is slidably connected to the rear cover via the sliding rods. The rear cover includes a first frame positioned in a center of the rear cover, a first magnetic member received in the first frame, and two second magnetic members positioned respectively on opposite sides of the first magnetic member. The front cover includes a second frame positioned in a center of the front cover, a third magnetic member received in the second frame, and two fourth magnetic members positioned respectively on opposite sides of the third magnetic member. The first frame includes two recessed portions defined in two opposite sidewalls correspondingly. The second frame includes two protruding portions formed on two opposite sidewalls correspondingly. Each of the protruding portions engages with each of the recessed portions correspondingly. Thus, when the front cover is slid to a closed position, the wobbling between the front cover and the rear cover would be prevented, and the front cover would stably slide relative to the rear cover.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present slide mechanism. Moreover, in the drawings, like reference numerals designate corresponding parts throughout the several views, and all the views are schematic.

DETAILED DESCRIPTION OF THE EMBODIMENTS

Figure 1:
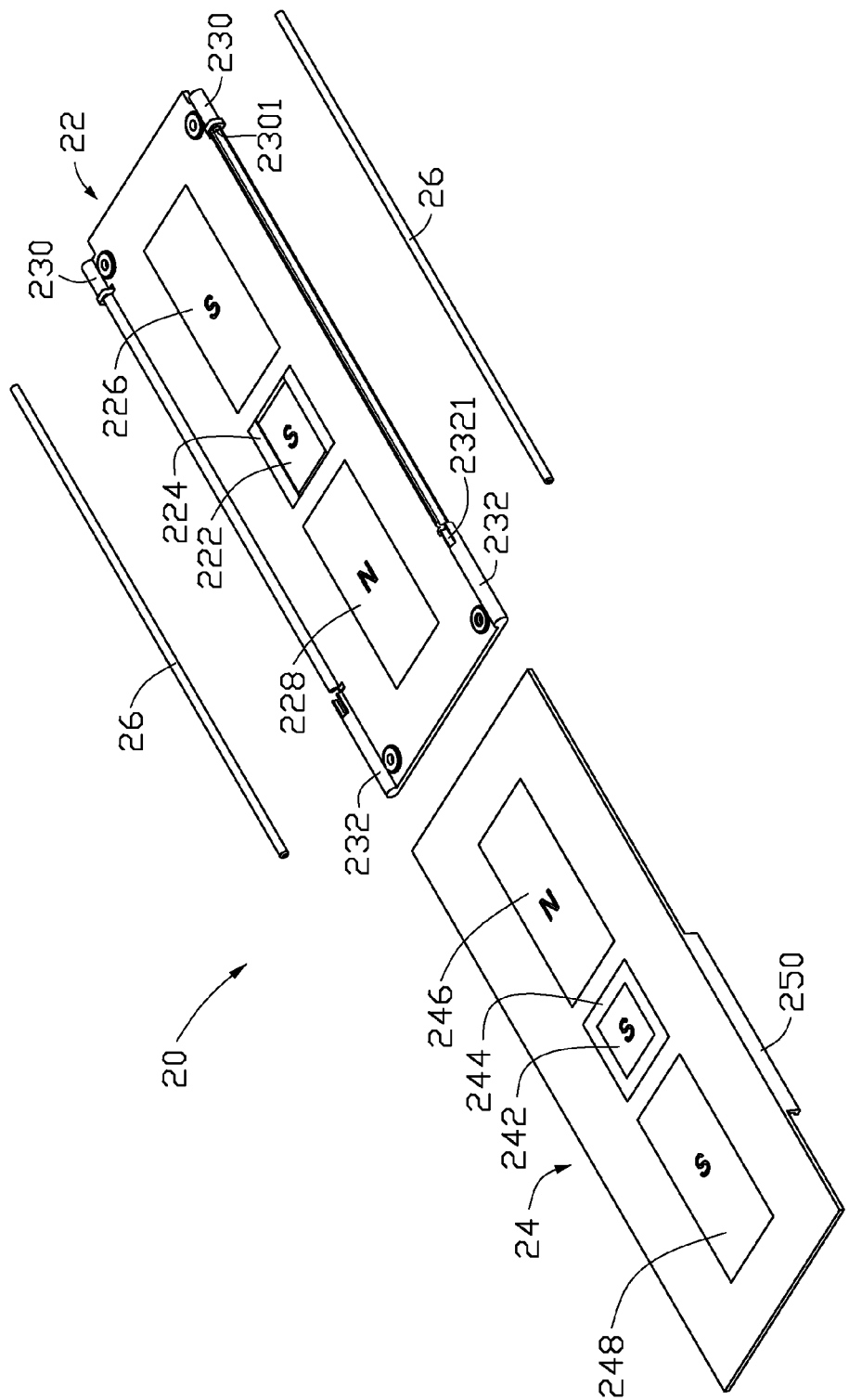
FIG. 1 is an exploded, isometric view of a slide mechanism of a first embodiment of the present invention.
Figure 2:
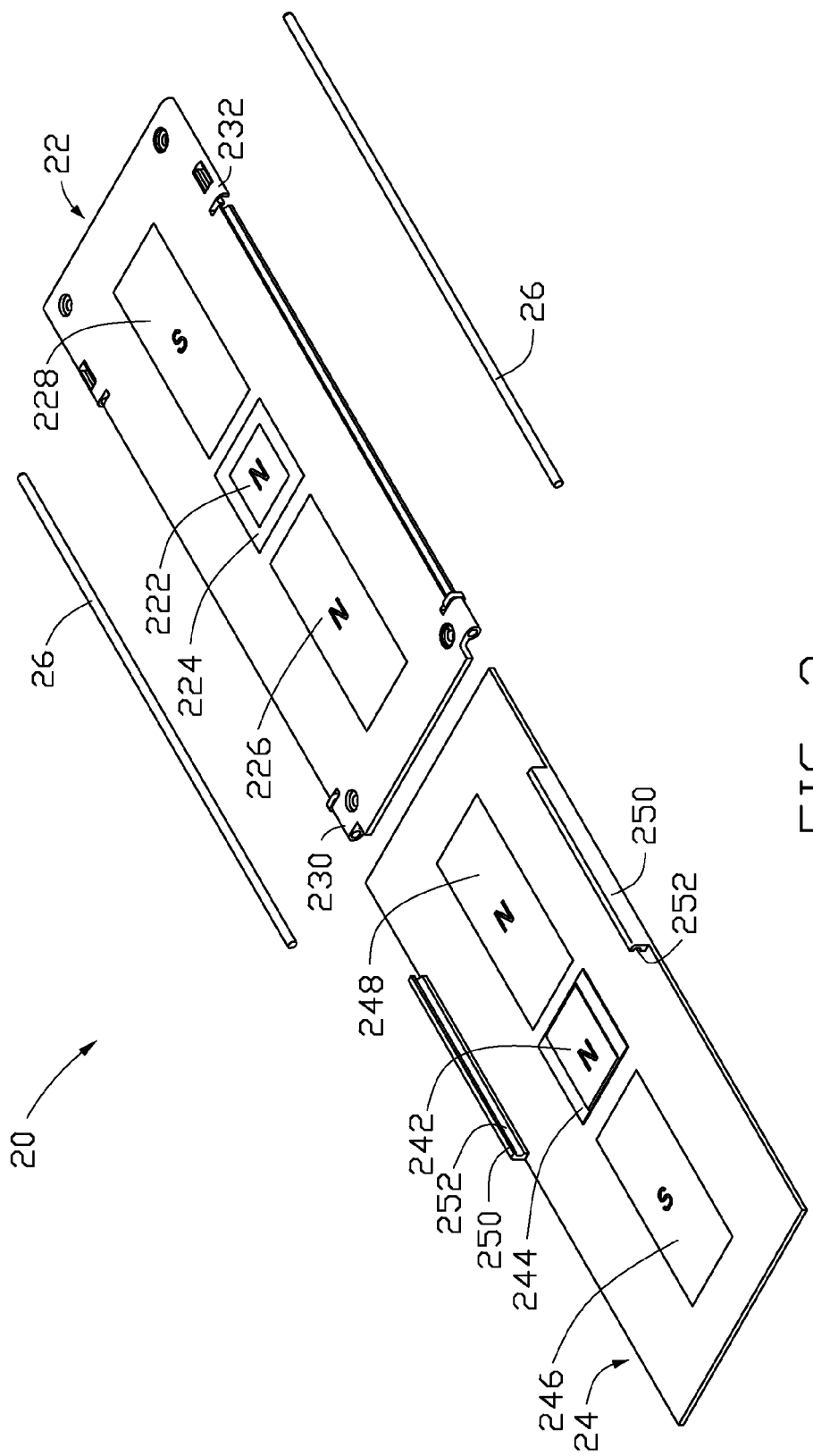
FIG. 2 is similar to FIG. 1, but viewed from another direction.

Referring to FIGS. 1 and 2, a slide mechanism 20 of a first embodiment includes a rear cover 22, a front cover 24, and two sliding rods 26.

The rear cover 22 is substantially a rectangular plate and includes a first magnetic member 222, a first frame 224, two second magnetic members 226, 228, two first positioning pins 230, and two second positioning pins 232.

The magnetic members 222, 226, 228 are rectangular magnets. The first magnetic member 222 is positioned on a center of the rear cover 22. The second magnetic members 226, 228 are positioned on opposite sides of the first magnetic member 222 and lengthwise of the rear cover 22.

Figure 3:
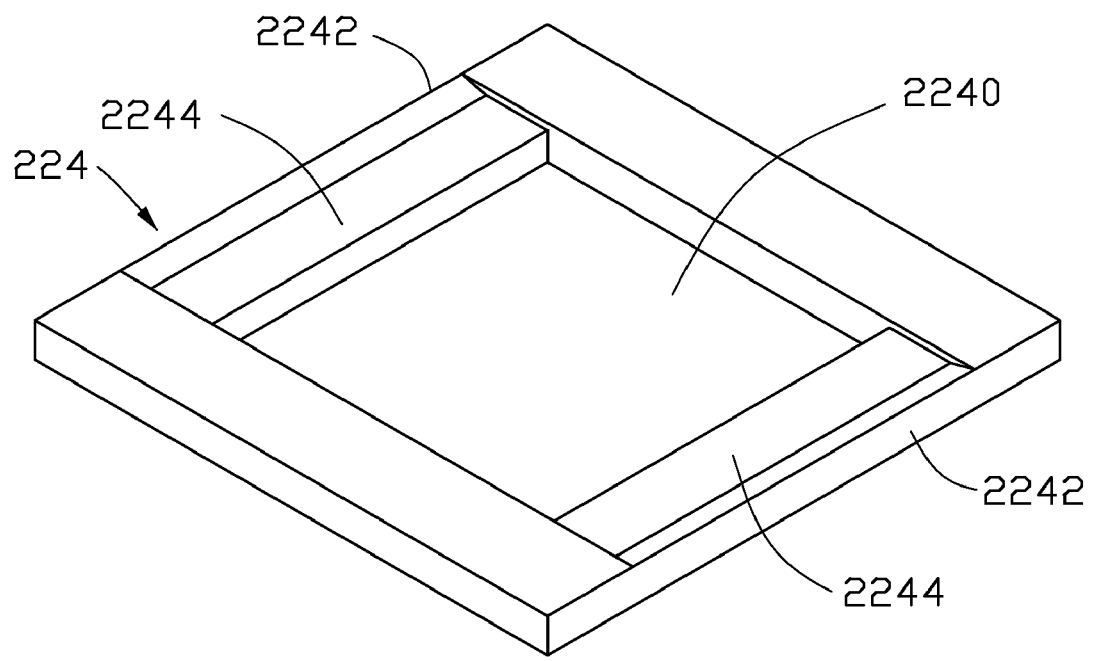
FIG. 3 is an isometric view of a first frame of the slide mechanism of FIG. 1.

Referring to FIG. 3, the first frame 224 includes four sidewalls 2242 cooperatively defining a rectangular hole 2240 for receiving the first magnetic member 222. The first frame 224 further includes two recessed portions 2244 defined in two sidewalls 2242 on opposite sides of the first frame 224 correspondingly.

Referring again to FIGS. 1 and 2, the first positioning protrusions 230 are positioned on a first end of the rear cover 22, and the second positioning protrusions 232 are formed on a second end of the rear cover 22 opposite to the first end. The first positioning pins 230 and the second positioning pins 232 define a hole 2301, 2321 in a center of the ends facing each other, i.e., the hole 2301 of one of the first positioning protrusions 230 is aligned with the hole 2321 of one of the second positioning protrusions 232 correspondingly.

The front cover 24 is substantially a rectangular plate and a size of the front cover 24 corresponds to that of the rear cover 22. The front cover 24 includes a third magnetic member 242, a second frame 244, two fourth magnetic members 246, 248, and two guide rails 250.

The magnetic members 242, 246, 248 are rectangular magnets. The third magnetic member 242 is positioned on a center of the front cover 24 corresponding to the first magnetic member 222. The fourth magnetic members 246, 248 are positioned at opposite sides of the third magnetic member 242 corresponding to the second magnetic members 226, 228. The size of the third magnetic member 242 equals to that of the first magnetic member 222. A magnetic strength of the third magnetic member 242 is equal to that of the first magnetic member 222. Accordingly, a size of the fourth magnetic members 246, 248 equals to that of the second magnetic members 226, 228. A magnetic strength of either fourth magnetic members 246, 248 is equal to that of either second magnetic members 226, 228, respectively. The magnetic strength of either magnetic members 222 or 242 is stronger than that of either magnetic members 226, 248, or 228, 246, respectively.

Figure 4:
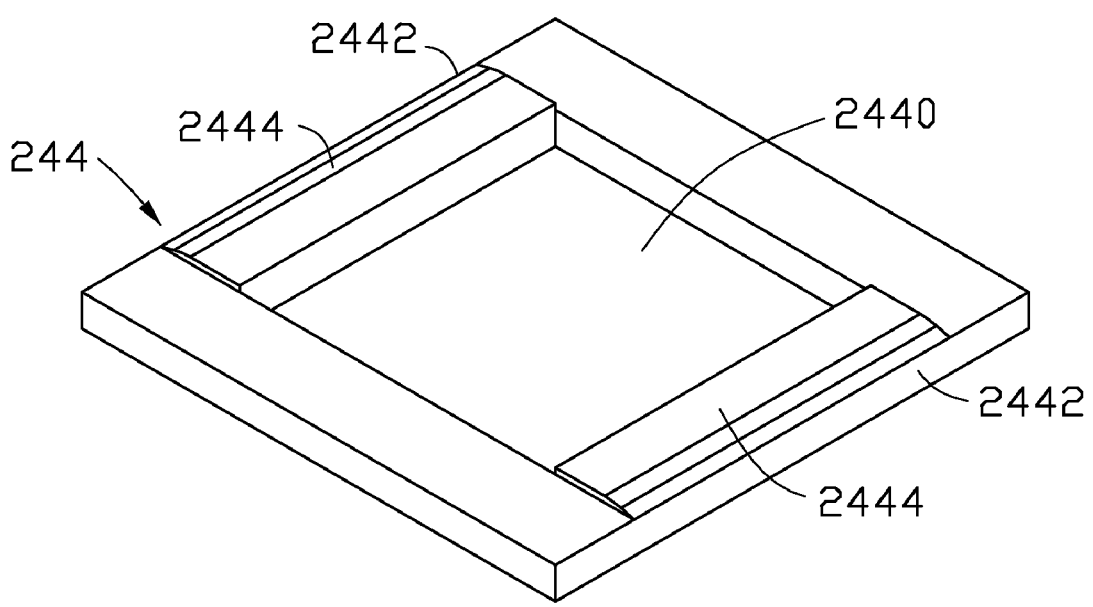
FIG. 4 is an isometric view of a second frame of the slide mechanism of FIG. 1.

Referring to FIG. 4, the second frame 244 includes four sidewalls 2442 cooperatively defining a rectangular hole 2440 for receiving the third magnetic member 242. The second frame 244 further includes two protruding portions 2444 formed on two sidewalls 2442 on opposite sides of the second frame 244 correspondingly. Each of the protruding portions 2444 corresponds to one of the recessed portion 2244 of the first frame 224.

The guide rails 250 are formed on opposite sides of the front cover 24 and extends downwards from a bottom surface of the front cover 24. Each of the guide rails 250 defines a sliding groove 252 in an inside surface of the guide rails 250.

Each of the sliding rods 26 is substantially a cylinder and two ends of each sliding rod 26 can be inserted into the hole 2301 of the first positioning pin 230 and the hole 2321 of the second positioning pin 232 correspondingly. Each of the sliding rods 26 corresponds to the sliding groove 252 of one corresponding guide rail 250.

In assembly of the slide mechanism 20, the first frame 224, together with the first magnetic member 222, is mounted on the rear cover 22. The second frame 244, together with the third magnetic member 242, is mounted on the front cover 24. An end of one of the sliding rods 26 is inserted into the hole 2301 of one of the first positioning protrusions 230, and another end of the one of the sliding rods 26 is inserted into the hole 2321 of one of the second positioning protrusions 232 correspondingly. Another sliding rod 26 is attached to the other first positioning protrusion 230 and the other second positioning protrusion 232 in a similar manner. The front cover 24 is mounted to the rear cover 22 and the two guide rails 250 engage with the two sliding rods 26 correspondingly. Thus, the front cover 24 is slidably connected to the rear cover 22.

After the slide mechanism 20 is assembled, portions of the first and second magnetic members 222, 242 facing each other have an opposite polarity. In this embodiment, the portion of the first magnetic member 222 facing the front cover 24 has a "S" polarity, and the portion of the third magnetic member 242 facing the rear cover 22 has a "N" polarity. Therefore, the first magnetic member 222 and the third magnetic member 242 are attracted to each other when the front cover 24 is closed over the rear cover 22. Portions of one second magnetic member 226/228 and one corresponding fourth magnetic member 246/248 facing each other have a same polarity. In this embodiment, portions of the second magnetic members 226, 228 facing the front cover 24 have an "S" polarity and an "N" polarity respectively, and portions of the fourth magnetic members 246, 248 facing the rear cover 22 have an "S" polarity and an "N" polarity respectively. Therefore, the second magnetic member 226/228 and the fourth magnetic member 246/248 repel each other when the front cover 24 is closed over the rear cover 22.

Figure 5:
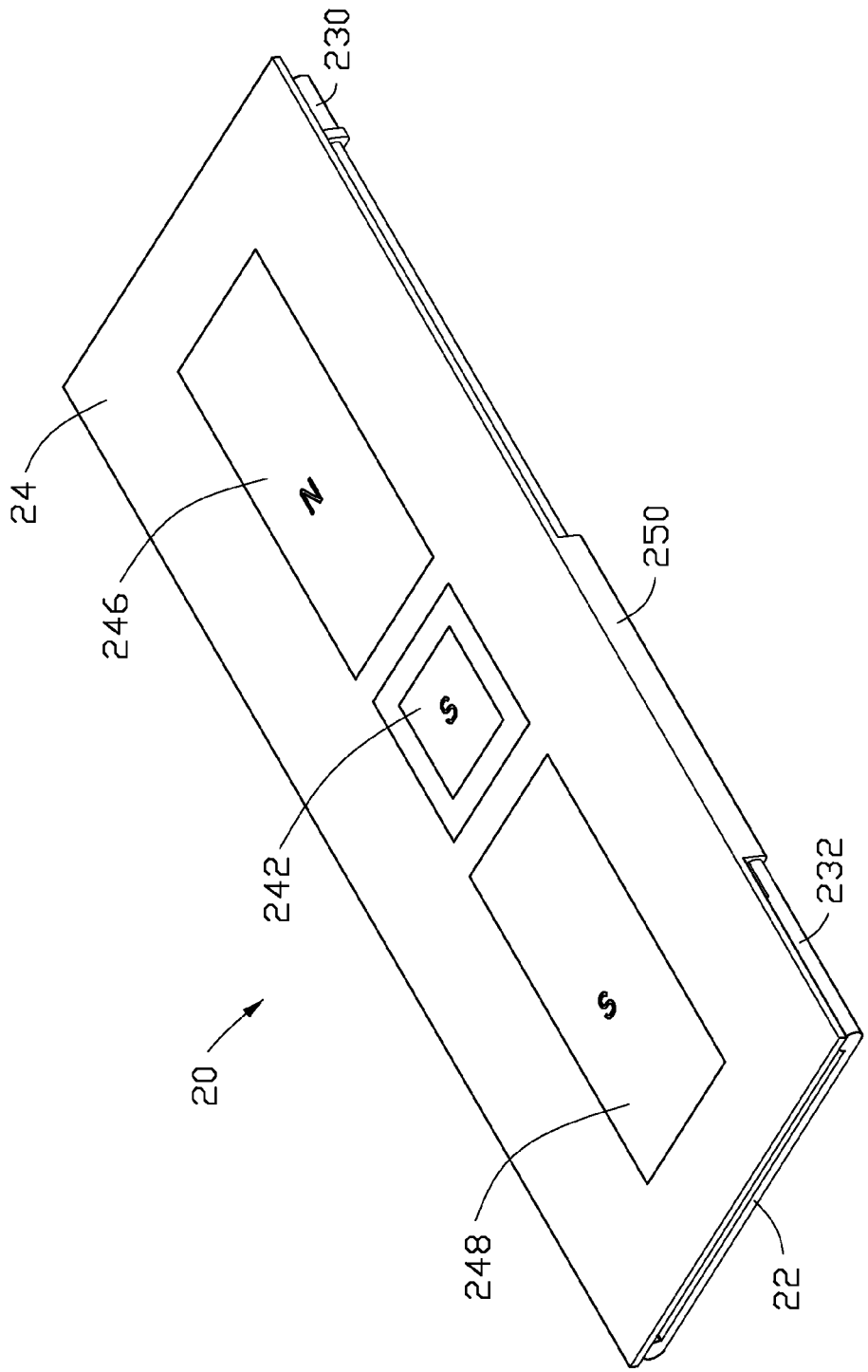
FIG. 5 is an assembled, isometric view of the slide mechanism of FIG. 1, showing a front cover closed relative to a rear cover.

Referring to FIGS. 1 and 5, when the front cover 24 is fully folded over and covers the rear cover 22, the protruding portions 2444 of the second frame 244 engage in the recessed portions 2244 of the first frame 224.

Figure 6:
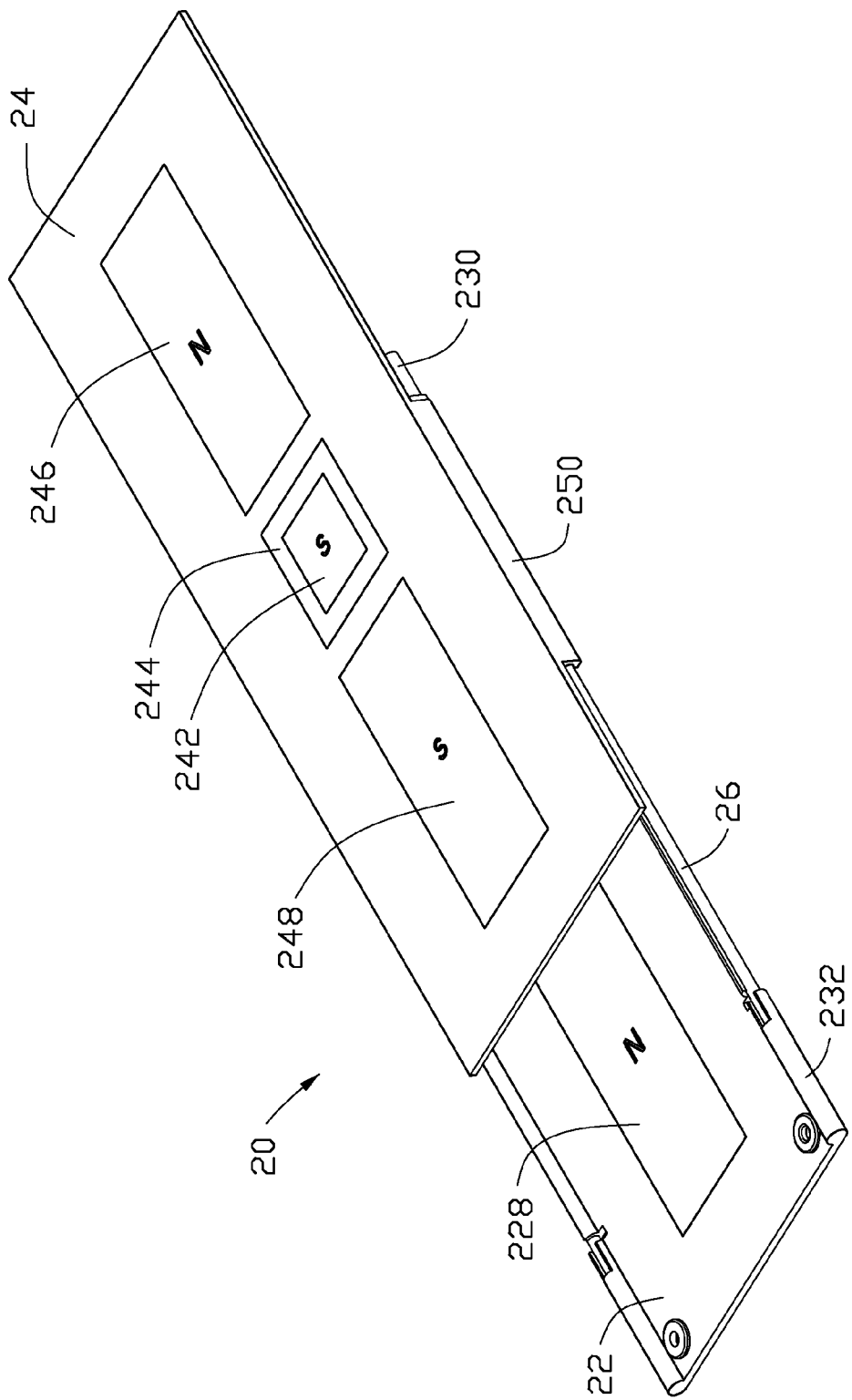
FIG. 6 is an assembled, isometric view of the slide mechanism of FIG. 1, showing the front cover opened relative to the rear cover.

Referring to FIGS. 1 and 6, to open the slide mechanism 20, an external force is applied to the front cover 24 to make the front cover 24 slide along the sliding rods 26. The protruding portions 2444 of the second frame 244 slide out of the recessed portions 2244 of the first frame 224. The third magnetic member 242 moves away from the first magnetic member 222 gradually, such that a magnetic attractive force created by the first and third magnetic members 222, 242 weakens gradually. When a magnetic repelling force created by the magnetic members is stronger than the magnetic attractive force created by the magnetic members, the front cover 24 slides along a direction from the second positioning pins 232 towards the first positioning pins 230 automatically, until the guide rails 250 of the front cover 24 contacts the first positioning pins 230. Thus, the slide mechanism 20 is opened.

To close the slide mechanism 20, an external force is applied to the front cover 24 such that the front cover 24 slide along the sliding rods 26. The third magnetic member 242 moves closer to the first magnetic member 222 gradually, such that the magnetic attractive force created by the first and third magnetic members 222, 242 strengthen gradually. When the magnetic attractive force created by the magnetic members is stronger than the magnetic repelling force created by the magnetic members, the front cover 24 slides along a direction from the first positioning pins 230 toward the second positioning pins 232 automatically, until the guide rails 250 of the front cover 24 contacts with the second positioning pins 232. Thus, the slide mechanism 20 is closed.

When the slide mechanism 20 is closed, the protruding portions 2444 of the second frame 244 engage in the recessed portions 2244 of the first frame 224 again. Therefore, the front cover 24 cannot be moved by the magnetic repelling force created by the second magnetic members 226, 228 and the fourth magnetic members 246, 248. Thus, the wobbling between the front cover 24 and the rear cover 22 would be prevented, and the front cover 24 would stably slide relative to the rear cover 22.

Figure 7:
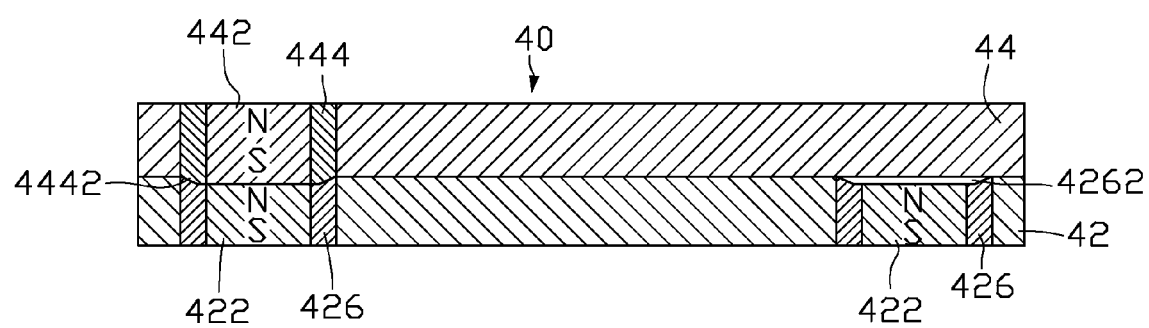
FIG. 7 is a cross-sectional view of a slide mechanism of a second embodiment of the present invention, showing a front cover closed relative to a rear cover.

Referring to FIG. 7, a slide mechanism 40 of a second embodiment is shown. The slide mechanism 40 includes a rear cover 42 and a front cover 44. The rear cover 42 includes two first frames 426 and two first magnetic members 422 received in the two first frames 426 respectively, and the two first frames 426 together with the two first magnetic members 422 are mounted in two ends of the rear cover 42. The front cover 44 includes a second frame 444 and a second magnetic member 442 received in the second frame 444, and the second frame 444 together with the second magnetic member 442 is mounted in an end of the cover 44. A recessed portion 4262 is defined in each of the first frames 426. A protruding portion 4442 is formed on the second frame 444 to engage with the recessed portion 4262. In addition, portions of the each first magnetic member 422 and the second magnetic member 442 facing each other have an opposite polarity, such that the first and second magnetic members 422, 442 are attracted to each other.

Figure 8:
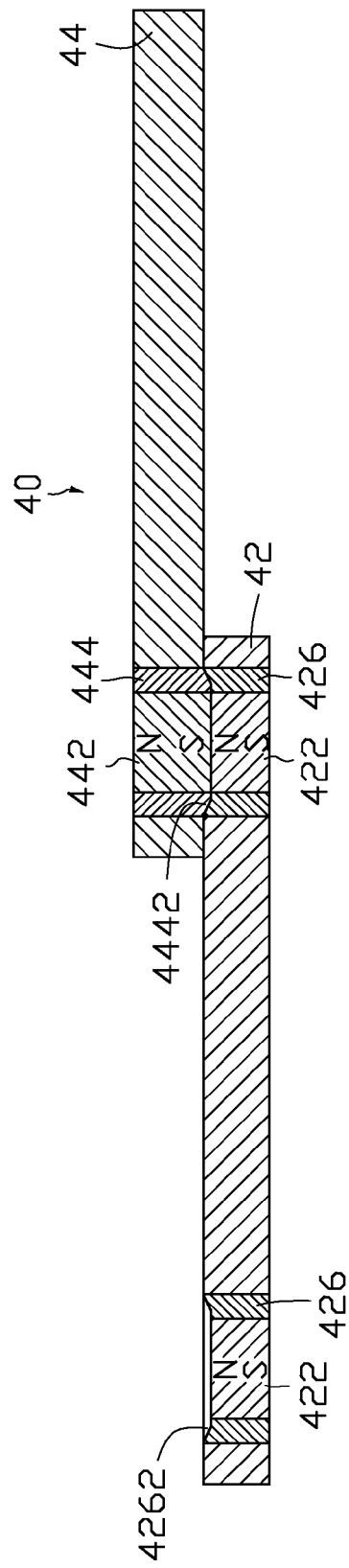
FIG. 8 is similar to FIG. 7, but showing the front cover opened relative to the rear cover.

The slide mechanism 40 can be opened/closed automatically via a magnetic attractive force created by the first and second magnetic members 422, 442. When the slide mechanism 40 is closed, the protruding portion 4442 of the second frame 444 engages in the recessed portion 4262 of one of the first frames 426. Referring to FIG. 8, When the slide mechanism 40 is opened, the protruding portion 4442 of the second frame 444 engages in the recessed portion 4262 of the other one of the first frames 426. Thus, the wobbling between the front cover 44 and the rear cover 42 would be prevented, and the front cover 44 would stably slide relative to the rear cover 42.

Figure 9:
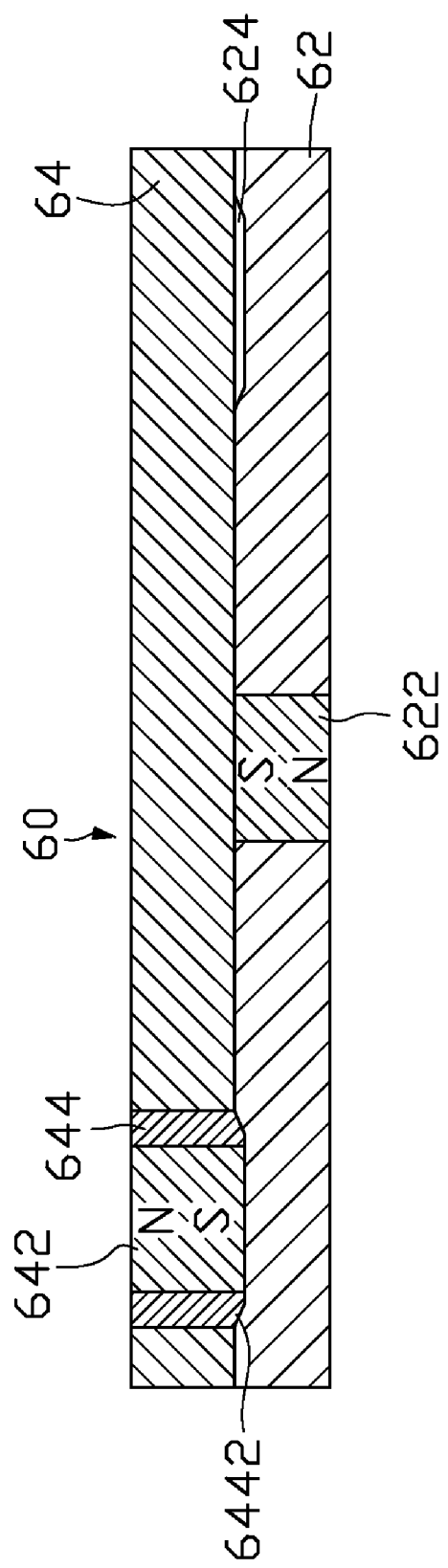
FIG. 9 is a cross-sectional view of a slide mechanism of a third embodiment of the present invention, showing a front cover closed relative to a rear cover.

Referring to FIG. 9, a slide mechanism 60 of a third embodiment is shown. The slide mechanism 60 includes a rear cover 62 and a front cover 64. The rear cover 62 includes a first magnetic member 622 positioned in a center and two recessed portions 624 positioned in two ends of the rear cover 62. The front cover 64 includes a second frame 644 and a second magnetic member 642 received in the second frame 644, and the second frame 644 together with the second magnetic member 642 is mounted in an end of the front cover 64. A protruding portion 6442 is formed on the second frame 644, and the protruding portion 6442 can engage in each of the recessed portions 624 of the rear cover 62. In addition, portions of the first and second magnetic members 622, 642 facing each other have a same polarity, such that the first and second magnetic members 622,642 repel each other.

The slide mechanism 60 can be opened/closed automatically via a magnetic repelling force created by the first and second magnetic members 622, 642. When the slide mechanism 60 is closed, the protruding portion 6442 of the second frame 644 engages in one of the recessed portions 624. When the slide mechanism 60 is opened, the protruding portion 6442 of the second frame 644 engages in the other one of the recessed portions 624. Thus, the wobbling between the front cover 64 and the rear cover 62 would be prevented, and the front cover 64 would stably slide relative to the rear cover 62.

Figure 10:
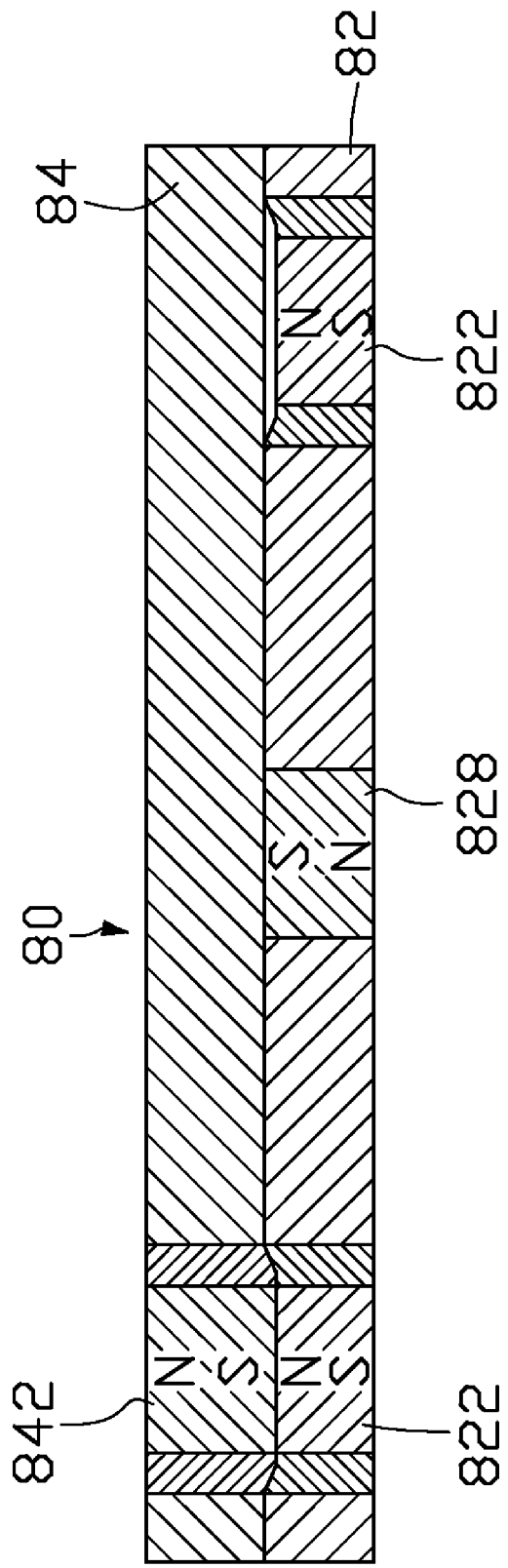
FIG. 10 is a cross-sectional view of a slide mechanism of a fourth embodiment of the present invention, showing a front cover closed relative to a rear cover.

Referring to FIG. 10, a slide mechanism 80 of a fourth embodiment is shown. The slide mechanism 80 is similar in principle to the slide mechanism 40 of the second embodiment. A rear cover 82 has two first magnetic members 822 positioned in two ends of the rear cover 82. A front cover 84 has a third magnetic member 842 positioned in an end of the front cover 84. However, a rear cover 82 further includes a second magnetic member 828 positioned between the two first magnetic members 822. In addition, portions of the second and third magnetic members 828, 842 facing each other have a same polarity.

In an alternative embodiment, a shape of the magnetic members may be circular, triangular, and so on. The frames may be integrally formed with the rear cover or the front cover. A sliding distance of the front cover slide relative to the rear cover may be changed by changing a length of the guide rails of the front cover. When the guide rails have a greater length, the sliding distance of the front cover is decreased. When the guide rails have a little length, the sliding distance of the front cover is increased.

In an alternative embodiment, the protruding portions may be formed on the rear cover, and the recessed portions may be defined in the front cover. The protruding portions are configured to engage in the recessed portions. It should be understood that, when one of the front cover and the rear cover forms a protruding portion, and the other one of the front cover and the rear cover defines a recessed portion. The protruding portion may engage in the recessed portion. Thus, the wobbling between the front cover and the rear cover would be prevented, and the front cover would stably slide relative to the rear cover.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A slide mechanism comprising:
    a rear cover;
    a front cover slidably connected to the rear cover; and
    at least two magnetic members positioned on the rear cover and the front cover correspondingly, the at least two magnetic members configured for forcing the front cover opened or closed relative to the rear cover semi-automatically;
    wherein one of the front cover and the rear cover forms at least one protruding portion, and the other one of the front cover and the rear cover defines at least one recessed portion for engaging with the protruding portion; the at least two magnetic members comprises: a first magnetic member positioned on a center of the rear cover; two second magnetic members positioned on opposite sides of the first magnetic member, correspondingly; a third magnetic member positioned on a center of the front cover; and two fourth magnetic members positioned on opposite sides of the third magnetic member correspondingly.

2. The slide mechanism as claimed in claim 1, wherein a magnetic strength of the first magnetic member is equal to that of the third magnetic member, and a magnetic strength of the second magnetic members is equal to that of the fourth magnetic members; the magnetic strength of either the first and the third magnetic members is stronger than that of either the second and the fourth magnetic members, respectively.

3. The slide mechanism as claimed in claim 2, wherein the first magnetic member and the third magnetic member are attracted to each other and the second magnetic member and the fourth magnetic member repel each other when the front cover is closed over the rear cover.

4. The slide mechanism as claimed in claim 1, wherein the rear cover comprises a first frame having four connecting sidewalls cooperatively defining a rectangular hole for receiving the first magnetic member, and the at least one recessed portion is defined in the first frame; the front cover comprises a second frame having four connecting sidewalls cooperatively defining a rectangular hole for receiving the third magnetic member, and the at least one protruding portion is formed on the second frame.

5. The slide mechanism as claimed in claim 4, wherein the first frame is integrally formed with the rear cover and the second frame is integrally formed with the front cover.

6. The slide mechanism as claimed in claim 1, wherein the front cover further comprises two guide rails positioned on opposite sides of the front cover, each of the guide rails defines a sliding groove in an inside surface of the guide rails; the slide mechanism further comprising two sliding rods, the sliding grooves of the guide rails are configured to engages with the sliding rods correspondingly.

7. The slide mechanism as claimed in claim 6, wherein the rear cover further comprises two first positioning pins positioned on a first end of the rear cover, and two second positioning pins positioned on a second end of the rear cover opposite to the first end, the first positioning pins and the second positioning pins define a hole in a center of the ends facing each other; two ends of each of the sliding rods are inserted into the hole of the first positioning pin and the hole of the second positioning pin correspondingly.

8. The slide mechanism as claimed in claim 1, wherein the at least two magnetic members comprises two first magnetic members positioned in two ends of the rear cover, and a second magnetic member positioned in an end of the front cover; each of the first magnetic members and the second magnetic member can be attracted to each other.

9. The slide mechanism as claimed in claim 8, wherein the rear cover comprises two first frames for receiving the two first magnetic members, and the at least one recessed portion is defined in one of the two first frames; the front cover comprises a second frame for receiving the second magnetic members, and the at least one protruding portion is formed on the second frame.

10. The slide mechanism as claimed in claim 1, wherein the at least two magnetic members comprises a first magnetic member positioned in a center of the rear cover, and a second magnetic member positioned in an end of the front cover; the at least one recessed portion is two recessed portions defined in two ends of the rear cover; the front cover comprising a second frame for receiving the second magnetic member, the at least one protruding portion is formed on the second frame.

11. The slide mechanism as claimed in claim 1, wherein at least two magnetic members comprises two first magnetic members positioned in two ends of the rear cover, a second magnetic member positioned between the two first magnetic members, and a third magnetic member positioned in an end of the front cover.

12. A slide mechanism comprising:
   a rear cover forming at least one protruding portion;
   a front cover slidably connected to the rear cover, the front cover defining at least one recessed portion;
   at least one first magnetic member positioned on the rear cover; and
   at least one second magnetic member corresponding to the at least one first magnetic member positioned on the front cover;
      wherein the rear cover comprises a first frame having four connecting sidewalls cooperatively defining a rectangular hole for receiving the first magnetic member, and the at least one protruding portion is formed on the first frame; the front cover comprises a second frame having four connecting sidewalls cooperatively defining a rectangular hole for receiving the second magnetic member, and the at least one recessed portion is defined in the second frame; when the front cover slides to a closed state, the at least one protruding portion of the rear cover engages in the at least one recessed portion of the front cover, and when the front cover slides to an opened state, the at least one protruding portion of the rear cover disengages from the at least one recessed portion of the front cover.

13. A slide mechanism comprising:
   a rear cover forming at least two protruding portions;
   a front cover slidably connected to the rear cover, the front cover defining at least one recessed portion;
   at least one first magnetic member positioned on the rear cover; and
   at least one second magnetic member corresponding to the at least one first magnetic member positioned on the front cover;
      wherein the at least one first magnetic member is two first magnetic members positioned in two ends of the rear cover, and the at least one second magnetic member is one second magnetic member positioned in an end of the front cover; each of the first magnetic members and the second magnetic member can be attracted to each other; the rear cover comprises two first frames for receiving the two first magnetic members, and the at least two protruding portions formed on the two first frames; the front cover comprises a second frame for receiving the second magnetic members; and the at least one recessed portion is defined in the second frame; when the front cover slides to a closed state, one of the at least two protruding portions of the rear cover engages in the at least one recessed portion of the front cover, and when the front cover slides to an opened state, the other one of the at least two protruding portions of the rear cover engages in the at least one recessed portion of the front cover.

14. The slide mechanism as claimed in claim 13, wherein the at least one first magnetic member is positioned in a center of the rear cover, and the at least one second magnetic member is positioned in an end of the front cover; the at least two protruding portion is formed on two ends of the rear cover; the front cover comprises at least one second frame for receiving the at least one second magnetic member; and the at least one recessed portion is defined in the at least one second frame.

* * * * *